United States Patent Office 2,784,227
Patented Mar. 5, 1957

2,784,227

TRICHLOROMETHYL - ALKYLENE - TRITHIOPERCARBAMATES AND PREPARATION THEREOF

Hein L. Klopping, Wilmington, Del., assignor to E. I. du Pont de Nemours and Company, Wilmington, Del., a corporation of Delaware No Drawing. Application December 30, 1953,
Serial No. 401,365

3 Claims. (Cl. 260—567)

This invention relates to a class of new compounds, to processes for their preparation, and to fungicidal compositions and methods employing such compounds as essential active ingredients.

The compounds of the invention are obtained by the reaction of perchloromethyl mercaptan with an alkylene bis-dithiocarbamic acid or an alkali metal or alkaline earth metal salt thereof. The compounds are selected from the group consisting of compounds represented by the formula:

(1)
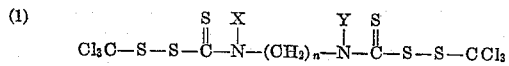

and polymers containing a plurality of groups represented by the formula

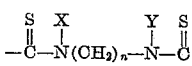

and a plurality of —SCCl₃ groups where X and Y are selected from the group consisting of hydrogen and the group Cl₃CS—, and n is an integer from 2 to 10 inclusive.

The compounds of the invention are characterized, and structurally distinguished from perchloromethyl mercaptan derivatives heretofore known, by containing at least one

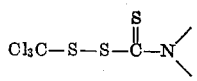

grouping.

By reaction of perchloromethyl mercaptan with an alkylene bis-dithiocarbamic acid or salt thereof according to the processes of this invention there is obtained a mixture of two or more compounds of the kind defined above. The kind and number of compounds formed in such a reaction and the relative proportions thereof in the resulting composition vary depending upon whether the dithio reactant is the acid or a salt thereof, and also upon the manipulative technique in bringing the reagents together and upon the reaction conditions such as the temperature and proportions. The resulting mixtures are, however, fungicidally active and can be used as such in preparing fungicidal compositions and making fungicidal treatments according to the invention. If desired, however, the several components of the mixture can be separated according to conventional techniques as will be shown hereinafter.

The most simple of the compounds of the invention are those obtained by reacting ethylene bis-dithiocarbamic acid, or a salt thereof such as the disodium salt, with perchloromethyl mercaptan; and because of commercial availability and cost considerations, the ethylene bis-dithiocarbamyl compound is a preferred reactant. Illustrative of compounds readily prepared from such reagents are:

Bis-(trichloromethyl)ethylene bis-(trithiopercarbamate)

Bis - (trichloromethyl) - N - (trichloromethylmercapto)ethylene bis-(trithiopercarbamate)

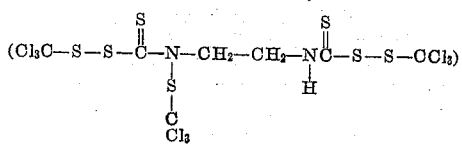

Bis - (trichloromethyl) - N,N' - bis - (trichloromethylmercapto)ethylene bis-(trithiopercarbamate)

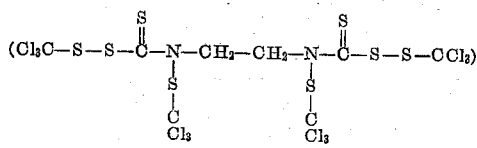

Poly[mono(perchloromethylmercapto)septi(ethylene thiuram monosulfide)]

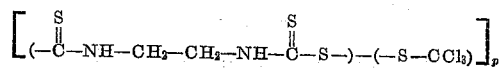

If cost is not a deterrant, one can also use as a reactant in place of the ethylene bis-dithiocarbamyl compound a higher alkylene bis-dithiocarbamic acid or salt thereof in which the alkylene bridge contains up to 10 carbon atoms and thus obtain compounds such as:

Bis(trichloromethyl)tetramethylene bis - (trithiopercarbamate)
Bis(tricholormethyl) - N - (trichloromethylmercapto)tetramethylene bis-(trithiopercarbamate)
Bis(trichloromethyl) - N,N' - bis(tricholormethylmercapto)tetramethylene bis(trithiopercarbamate)
Poly[mono(perchloromethylmercapto)septi(tetramethylene thiuram monosulfide)]
Bis(trichloromethyl)decamethylene bis - (trithiopercarbamate)
Bis(trichloromethyl) - N - (trichloromethylmercapto) pentamethylene bis-(trithiopercarbamate)
Poly[mono(perchloromethylmercapto)sexi(hexamethylene thiuram monosulfide)]

The reactants can be brought together for reaction according to various techniques. Thus a dithiocarbamate salt can be dissolved in water (or if the acid is used, it can be suspended in water) and the resulting aqueous mass mixed with liquid perchloromethyl mercaptan either by running streams of the fluid masses together simultaneously or by adding a stream containing one reactant to a body of the other reactant. The perchloromethyl mercaptan can be used as such or in solution in an inert solvent such as n-hexane or benzene. Also a non-reactive solvent such as n-hexane or benzene can be used instead of water to suspend or dissolve the dithiocarbamyl reactant.

Alternatively, the water or organic liquid used to dissolve or suspend the dithiocarbamyl reactant according to the method described in the preceding paragraph can be omitted and the dithiocarbamyl reactant thus charged to the reactor in dried powered form.

In carrying out the processes of the invention, the reactants are brought together in the proportion of from about 0.1 to 10.0 mols of perchloromethyl mercaptan, and usually from about 1 to 4 mols of that reagent, per mol of the dithiocarbamyl reactant.

For practical reasons, the temperature of the reacting mass should be maintained between about −10° C. and +70° C. At temperatures below this range, the reacting mass becomes viscous or solidifies and the reaction proceeds slowly. At higher temperatures, decomposition of reactants and products occurs at rapidly increasing rates as the temperature is increased.

As mentioned previously, the nature of the reaction products is to some extent dependent on the temperature maintained during the reaction. For example, if a dithiocarbamate salt is used as one reactant and it is desired to obtain a polymeric compound of the invention then the reacting mass should be maintained at a temperature below about +20° C. Such polymeric materials are not found in the reaction mixture if a temperature above about 20° C. is used with a dithiocarbamate salt reactant. If, on the other hand, the dithiocarbamic acid rather than its salt is used as the reactant, both polymeric and monomeric compounds are obtained operating anywhere within the aforementioned range of about −10° C. to 70° C.

The rate at which the reactants are brought together generally is not critical but it is preferred, if the mercaptan is being added to a solution or suspension of a dithiocarbamate salt, that it be added slowly. Good agitation is, of course, desirable since it speeds the reaction and prevents local overheating or cooling.

Compounds of the invention and methods for their preparation are illustrated by the following detailed examples which are given in addition to the examples recited above.

*Example 1*

A solution of 37 grams of disodium ethylene bis-dithiocarbamate in 300 ml. of water is cooled in an ice bath. While stirring vigorously, perchloromethyl mercaptan is added dropwise at a rate of 4 ml. per hour. Gradually, a light yellow precipitate forms. Addition is continued until about 11 ml. of perchloromethyl mercaptan have been added at which time a filtered sample of the filtrate no longer gives a precipitate when mixed with ferrous sulfate solution.

The reacting mass is stirred for an additional two hours. The precipitate is then separated by filtration, washed with water, and dried. The dried product, a light cream colored powder, weighs 24.5 grams. It melts at 122–130° C. with decomposition and then resolidifies to give a product melting at 175–185° C.

Five grams of the light cream colored powder are extracted twice with 200 ml. of boiling benzene. The solid residue is washed with hot benzene and dried. The dried product weighs 2.9 grams. It melts at 131°–135° C., then resolidifies. The resolidified material melts at about 165°–170° C. The product melting at 131°–135° C., referred to hereinafter as product I, has a formula corresponding to

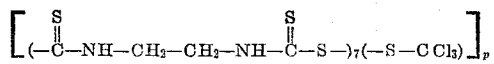

*Anal.*—Calc'd. for $(C_{29}H_{42}N_{14}S_{22}Cl_3)_p$: C, 24.9; H, 3.1; N, 14.0; S, 50.4; Cl, 7.6. Found: C, 24.0; H, 3.0; N, 14.15; S, 51.0; Cl, 7.85.

Product I has an X-ray diffraction pattern, using filtered copper radiation, in which the interplanar spacing value ($d$ value) of greatest intensity is 3.35 angstrom units, the $d$ values of intermediate intensity, in the order of decreasing intensity, are 4.27, 2.00, 1.38, 1.82, and 1.54 angstrom units, and the $d$ values of lower intensity are 3.88, 3.48, 3.13, 2.98, 2.82, 2.73, 2.64, 2.46, 2.29, 2.24, 2.13, 1.74, 1.67, 1.45, 1.29, 1.26, 1.23, 1.20, 1.18, 1.15, 1.08, 1.05, 1.04, 1.01, 0.99, 0.959, 0.916, 0.898, 0.812, and 0.791 angstrom units.

The major adsorption bands in the infra-red spectrum of product I are at 3.15, 6.63, 7.24, 7.42, 7.58, 8.00, 8.92, 9.30, 10.53, 10.80, and 11.65 wavelengths, in microns. The infra-red determination was made with a wafer or film pressed from a ground mixture of product I with potassium bromide.

The benzene extracts obtained by treatment of the precipitate as described in the third paragraph of this example contain a mixture of bis-(trichloromethyl)ethylene bis-(trithiopercarbamate) (VII), bis-(trichloromethyl)-N-(trichloromethylmercapto)ethylene bis-(trithiopercarbamate) (III), and bis-(trichloromethyl)-N,N'-bis-(trichloromethylmercapto)ethylene bis-(trithiopercarbamate) (IV).

Product VII is obtained from its benzene solution by evaporating benzene until crystallization occurs, cooling to complete the separation of the crystals and filtering. It is obtained as a white crystalline material, melting at 141–142° C. with decomposition to give an orange melt which resolidifies.

*Anal.*—Product VII calc'd. for $C_8H_6N_2S_6Cl_6$: C, 14.1; H, 1.2; N, 5.5; S, 37.6; Cl, 41.6. Found: C, 14.3; H, 1.4; N, 5.8; S, 37.6; Cl, 41.6.

Products III and IV can be recovered from the benzene filtrate as shown in the next example.

The disodium ethylene bis-dithiocarbamate reactant used in this example and in subsequent examples contained approximately five molecules of water per molecule of disodium ethylene bis-dithiocarbamate.

*Example 2*

A solution of 50 grams of disodium ethylene bis-dithiocarbamate in 200 ml. of water is filtered and added dropwise over a period of 15 minutes to a stirred solution of 44 ml. of perchloromethyl mercaptan in 500 ml. of n-hexane. At first, the temperature of the reacting mixture drops from about 25° C. to about 15° C. and then slowly warms up to room temperature as a light yellow solid separates. Gradually, the reacting mixture becomes a thick suspension. While stirring is continued, the temperature rises gradually to about 35° C., then rather suddenly to 40° C., and the solid vanishes almost completely.

Stirring is continued for several hours and the reaction mass is then allowed to stand overnight. The hexane layer is then separated, dried over sodium sulfate, and hexane removed by evaporation in vacuo until the mass is reduced to about half of its original volume at which point a cloudiness occurs in the liquid.

The concentrated mix is then placed in an ice bath to precipitate solids therefrom. After standing overnight, the precipitated solid is separated on a filter and dried. It, identified as product II herein, melts at 75°–80° C. and consists mainly of a mixture of bis-(trichloromethyl)-N-(trichloromethylmercapto)ethylene bis(trithiopercarbamate) (product III) and bis-(trichloromethyl)-N,N'-bis-(trichloromethylmercapto)ethylene bis-trithiopercarbamate) (product IV).

Product II is fractionally recrystallized from n-hexane. The least soluble compound is bis-(trichloromethyl)-N-(trichloromethylmercapto)ethylene bis-(trithiopercarbamate) (product III) which is recovered in the form of white needles melting at 98–99° C. This compound is insoluble in water and soluble in benzene and acetone.

*Anal.*—Calc'd for $C_7H_5N_2S_7Cl_9$: C, 12.7; H, 0.8; N, 4.2; S, 34.0; Cl, 48.3. Found: C, 12.9; H, 0.8; N, 4.6; S, 34.8; Cl, 48.4.

The more hexane soluble compound in product II is bis-(trichloromethyl)-N,N'- bis - (trichloromethylmercapto) ethylene bis-(trithiopercarbamate) (product IV) which is recovered as a white microcrystalline powder, M. P. 80–84° C., and is insoluble in water but soluble in benzene and acetone.

*Anal.*—Calc'd for $C_8H_4N_2S_8Cl_{12}$: C, 11.8; H, 0.5; N, 3.5; S, 31.7; Cl, 52.5. Found: C, 12.2; H, 0.7; N, 3.9; S, 32.8; Cl, 51.3.

*Example 3*

28 grams of ethylene bis-dithiocarbamic acid is suspended in 250 ml. of n-hexane. While stirring, a solution of 28 ml. of perchloromethyl mercaptan in 50 ml. of n-hexane is added dropwise over a period of 20 minutes. At this rate of addition, the temperature of the reacting mixture remains at about 35° C. without cooling. Hydrogen chloride evolves as the reaction proceeds. Stirring is continued overnight and then the mixture is heated to reflux temperature for a period of 90 minutes at the end of which period evolution of hydrogen chloride is no longer detectable.

The solid formed in the reaction is removed by filtration, washed with n-hexane, and dried. It is a cream colored powder, weighing 55 grams, and melting at 138–140° C. with decomposition.

20 grams of the cream colored powder (product V) are exhaustably extracted with boiling benzene. The undissolved residue, product VI, after drying, weighs 3 grams. It is a cream colored powder, insoluble in water and common organic solvents, melting at about 245° C. with decomposition.

Analysis.—C, 19.9; H, 6.3; N, 19.2; S, 8.6; Cl, 43.0.

The combined benzene extracts are evaporated in vacuo to a small volume and then cooled in an ice bath and filtered. There is obtained 15 grams of white crystalline bis-(trichloromethyl)ethylene bis-(trithiopercarbamate) (product VII), M. P. 141–142° C., with decomposition to give an orange melt which resolidifies.

The benzene filtrate remaining after separation of the white crystalline bis-(trichloromethyl)ethylene bis-(trithiopercarbamate) yields, on evaporation and treatment of the residue with cold hexane, 2 grams of product II, M. P. 75–80° C., a mixture of bis-(trichloromethyl)-N-(trichloromethylenemercapto)ethylene bis-(trithiopercarbamate) (product III) and bis-(trichloromethyl-N,N'-bis-(trichloromethylmercapto)ethylene bis-(trithiopercarbamate) (product IV).

*Example 4*

An aqueous suspension of ethylene bis-dithiocarbamic acid is prepared by adding 6 normal hydrochloric acid dropwise to a solution of 73 grams of disodium ethylene bis-dithiocarbamate in 1000 ml. of water while cooling in ice. Addition of the hydrochloric acid is continued until a filtered sample of the reaction mixture no longer gives a precipitate. Then 45 ml. of perchloromethyl mercaptan are added dropwise over a period of 30 minutes. The ice bath is removed and the mixture is stirred for 16 hours.

The precipitated solid is then removed by filtration, washed with water, and dried. The product (product V) is a light yellow powder weighing 76.5 grams and melts at 120–130° C. with decomposition.

20 grams of product V, prepared as above, are exhaustively extracted with benzene. The insoluble residue weighs one gram. It is a compound corresponding to the formula

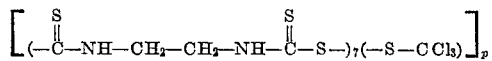

(product I), melting at 135° C. with decomposition and resolidifying to give a product melting at about 180° C.

The combined benzene extracts are evaporated in vacuo to a small volume. Crystallization occurs. After cooling in ice, the mass is filtered and dried. There is obtained 9 grams of white crystalline bis-(trichloromethyl) ethylene bis-(trithiopercarbamate) (product VII), melting at about 140° C.

The benzene filtrate obtained after separation of bis-(trichloromethyl)ethylene bis-(trithiopercarbamate) from the concentrated benzene extract is treated with an excess of n-hexane and cooled in ice. There is obtained 10 grams of product II melting at 75–80° C., a mixture of bis- (trichloromethyl) - N - (trichloromethylenemercapto) ethylene bis-(trithiopercarbamate) (product III) and bis-(trichloromethyl)- N,N'- bis - (trichloromethylmercapto)- ethylene bis-(trithiopercarbamate) (product IV).

While the preferred ethylene bis-dithiocarbamyl compound has been shown as the reactant in the foregoing examples, it will be understood that one can substitute therefor a higher alkylene dithiocarbamyl compound such as disodium tetramethylene bis-dithiocarbamate, disodium hexamethylene bis-dithiocarbamate, and disodium decamethylene bis-dithiocarbamate and obtain the corresponding polymethylene reaction product.

The trichloromethyl alkylene trithiopercarbamates of the invention are useful in compositions and methods for controlling and preventing or arresting the development and growth of fungi which infest plant or animal matter either in the natural or fabricated state. The non-phytotoxicity of the compounds makes them particularly suitable for application in plant disease control.

For application of a fungicidally active composition of the invention, the composition is preferably admixed with a carrier or conditioning agent of the kind used and referred to in the art as a "pest control" adjuvant or modifier in order to provide formulations adapted for ready and efficient application to plants or other material to be treated using conventional applicator equipment.

Thus the trichloromethyl alkylene trithiopercarbamate compositions are formulated by admixture with suitable carrier materials to provide compositions in the form of solutions, dusts, water-dispersible powders, and aqueous dispersions or emulsions.

Fungicidal dusts are compounded, for example, by admixing the active composition with finely divided solids, preferably, talcs, natural clays, pyrophyllite, diatomaceous earth, and other inert solid carriers of the kind conventionally employed in preparing pest control compositions in dust or powdered form.

Fungicidal solutions or suspensions are obtained by dissolving or suspending an active composition of the invention in a solvent or diluent liquid carrier such as kerosene, alkylated naphthalene, and like liquids conventionally employed in preparing pest control liquid compositions.

The fungicidal formulations of the invention whether in the form of dusts or liquids, preferably, also include as a carrier or conditioning agent a surface-active agent of the kind sometimes referred to in the art as a wetting, dispersing, emulsifying or penetrating agent. These agents, which will be referred to hereinafter more simply as "surface-active dispersing agents" caused the compositions to be easily dispersed in water to give aqueous sprays which for the most part constitute a desirable method of application.

The surface-active dispersing agents employed can be of the anionic, cationic, or nonionic type and include, for example, sodium oleate, sulfonated petroleum oils, sodium lauryl sulfate, polyethylene oxides, and other surface-active dispersing agents such as those listed in detail in articles by McCutcheon in "Soap and Sanitary Chemicals," August, September, and October of 1949.

The content of the trichloromethyl alkylene trithiopercarbamate composition in the fungicidal formulations of the invention will vary according to the manner in which and the purpose for which the composition is to be applied but, in general, will be from about 0.5 to 95% by weight of the composition.

The amount of surface-active dispersing agent employed in the fungicidal formulations of the invention will vary depending upon the effectiveness of the particular surface active dispersing agent employed and the properties of other materials in the formulation. Generally, the surface-active dispersing agent will not comprise more than about 10% by weight of the formulation and with the better materials will be 5% or less.

Materials to be protected from fungus infestation are treated by applying the fungicidal compositions to such material. The active ingredient is, of course, applied in amount sufficient to exert the desired fungicidal action. The treatment can be made by applying the composition directly to the material to be protected during the period of infestation or, alternatively, the treatment can be made in advance of an anticipated infestation.

A wide variety of fungi can be effectively controlled using compositions of the invention. For example, excellent control has been obtained of such fungi as early blight of tomato (*Alternaria solani*), late blight of tomato (*Phytophthora infestans*), bean rust (*Uromyces appendiculatus*), and apple scab (*Venturia inaequalis*) by applying compositions containing less than 0.1% by weight of the active trichloromethyl alkylene trithiopercarbamate product.

Other fungicidally active materials, insecticides, and other pest control agents can be included in the fungicidal compositions of the invention is desired. Also if the compositions are to be applied to the treatment of growing crops, fertilizer materials can be included.

I claim:

1. Bis - (trichloromethyl)ethylene bis - (trithiopercarbamate), a compound represented by the formula

2. A method for the preparation of trichloromethyl alkylene trithiopercarbamates which method comprises reacting perchloromethyl mercaptan with an alkylene thiocarbamyl compound having 2–10 carbon atoms in the alkylene radical, said thiocarbamyl compound being selected from the group consisting of alkylene bis-dithiocarbamic acids, alkali metal and alkaline earth metal salts thereof in proportions of from about 0.1 to 10 mols of the perchloromethyl mercaptan per mol of said thiocarbamyl compound at a temperature of about $-10°$ C. to $70°$ C.

3. A method for the preparation of bis-trichloromethyl)ethylene bis-(trithiopercarbamate), a compound represented by the formula

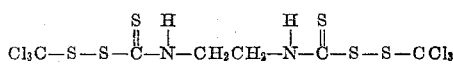

which comprises reacting 2 mols of perchloromethyl mercaptan with 1 mol of ethylene bis-dithiocarbamic acid in liquid media at $-10°$ C. to $70°$ C. whereby a solid precipitates, contacting the solid with benzene to form a solution in benzene of benzene soluble materials contained in said solid, separating said benzene solution and crystallizing bis-(trichloromethyl)ethylene bis-(trithiopercarbamate) therefrom.

No references cited.